US010059287B2

(12) United States Patent
Dufford

(10) Patent No.: US 10,059,287 B2
(45) Date of Patent: Aug. 28, 2018

(54) SYSTEM AND METHOD FOR ENHANCED COMFORT PREDICTION

(71) Applicant: Toyota Motor Engineering & Manufacturing North America, Inc., Erlanger, KY (US)

(72) Inventor: Mohammad E. Dufford, Los Angeles, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 15/046,310

(22) Filed: Feb. 17, 2016

(65) Prior Publication Data

US 2017/0232915 A1 Aug. 17, 2017

(51) Int. Cl.
*B60R 16/037* (2006.01)
*G01C 21/34* (2006.01)

(52) U.S. Cl.
CPC ........ *B60R 16/037* (2013.01); *G01C 21/3407* (2013.01)

(58) Field of Classification Search
CPC ............ G01C 21/3647; G01C 21/3641; G01C 21/3415; G01C 21/3492; G01C 21/3602; G01C 21/3691; G01C 21/26; G01C 21/3469; G01C 21/3484; G01C 21/367; B60R 25/2018; B60R 25/2081; B60R 2001/1215; B60R 2001/1253; B60R 16/037; B60R 2022/4433; B60R 22/44;
(Continued)

(56) References Cited

U.S. PATENT DOCUMENTS

| 5,170,433 A | 12/1992 | Elliott et al. |
| 6,783,195 B1 | 8/2004 | Grabsch |

(Continued)

FOREIGN PATENT DOCUMENTS

| DE | 10 2010 011319 | 9/2011 |
| GB | 2 335 404 | 9/1999 |
| WO | WO 2014/026165 | 2/2014 |

OTHER PUBLICATIONS

Lawrence Ulrich, *Range Rover Sport SVR: Driving Land Rover's chameleon*, BBC.com, May 20, 2015, 20 pages.

*Primary Examiner* — Courtney D Heinle
*Assistant Examiner* — Luis A Martinez Borrero
(74) *Attorney, Agent, or Firm* — Snell & Wilmer LLP

(57) ABSTRACT

Methods, systems, and apparatus for enhanced comfort prediction. A system includes one or more external databases connected through a network to a vehicle. The vehicle includes a navigation unit for obtaining navigational map information, one or more sensors that monitor an environment of the vehicle, a memory to store a route history, a plurality of comfort adjustable vehicle components and an electronic control unit (ECU) that is coupled to at least the navigation unit, the one or more sensors, and the plurality of comfort adjustable vehicle component. The ECU may determine a predicted route set and one or more predicted ride interruption event based on the navigational map information, vehicle information and a route history. The ECU may detect a ride interruption event and send a first signal to the first comfort adjustable vehicle component to have the first comfort adjustable vehicle component operate in an enhanced comfort mode.

19 Claims, 8 Drawing Sheets

(58) Field of Classification Search
CPC .............. B60R 16/0373; B60R 16/023; B60R 16/0236; B60R 25/257; B60W 10/101; B60W 10/119; B60W 10/184; B60W 10/20
USPC ....... 701/1, 36, 41, 22, 70, 93, 102, 112, 38, 701/117, 2
See application file for complete search history.

(56) References Cited

U.S. PATENT DOCUMENTS

| | | | |
|---|---|---|---|
| 7,222,004 B2 | 5/2007 | Anderson | |
| 7,292,936 B2 | 11/2007 | Furukawa | |
| 7,510,051 B2 | 3/2009 | Schrandt | |
| 7,519,472 B1 | 4/2009 | Grigsby et al. | |
| 7,639,148 B2* | 12/2009 | Victor | B60K 28/06 340/439 |
| 8,285,545 B2 | 10/2012 | Lee et al. | |
| 8,566,013 B2 | 10/2013 | Davis et al. | |
| 9,008,858 B1* | 4/2015 | Payne | B60H 1/00771 701/1 |
| 9,109,913 B2* | 8/2015 | Lu | G01C 21/3461 |
| 2007/0021886 A1* | 1/2007 | Miyajima | B60G 17/019 701/37 |
| 2007/0106468 A1 | 5/2007 | Eichenbaum et al. | |
| 2010/0241342 A1 | 9/2010 | Scalf et al. | |
| 2010/0280751 A1* | 11/2010 | Breed | G08G 1/161 701/414 |
| 2010/0324781 A1* | 12/2010 | Gagliano | B60G 17/0165 701/39 |
| 2011/0046877 A1* | 2/2011 | Hoffmann | G01C 21/3492 701/467 |
| 2012/0290171 A1* | 11/2012 | Koumura | B60G 17/0165 701/37 |
| 2013/0024060 A1* | 1/2013 | Sukkarie | G01C 21/26 701/22 |
| 2013/0182865 A1 | 7/2013 | Paul | |
| 2013/0198031 A1* | 8/2013 | Mitchell | G01C 21/3476 705/26.8 |
| 2014/0046595 A1* | 2/2014 | Segawa | G01C 21/34 701/541 |
| 2014/0278051 A1* | 9/2014 | McGavran | G01C 21/00 701/400 |
| 2014/0278070 A1* | 9/2014 | McGavran | G01C 21/00 701/465 |
| 2014/0309806 A1* | 10/2014 | Ricci | B60Q 1/00 701/1 |
| 2015/0094948 A1* | 4/2015 | Lu | G01C 21/3461 701/410 |
| 2015/0179062 A1* | 6/2015 | Ralston | G01C 21/26 701/117 |
| 2015/0232065 A1* | 8/2015 | Ricci | B60R 25/01 701/36 |
| 2015/0314663 A1* | 11/2015 | Rhode | B60G 17/0165 701/37 |
| 2016/0334228 A1* | 11/2016 | Wang | G01C 21/3641 |
| 2016/0378112 A1* | 12/2016 | Ljubuncic | B60W 30/16 701/45 |
| 2017/0129298 A1* | 5/2017 | Lu | B60G 17/015 |
| 2017/0136842 A1* | 5/2017 | Anderson | B60G 17/016 |
| 2017/0182859 A1* | 6/2017 | Anderson | B60G 17/019 |

* cited by examiner

SYSTEM AND METHOD FOR ENHANCED COMFORT PREDICTION

BACKGROUND

Field

This specification relates to prediction and preparation of an enhanced comfort mode for a vehicle.

Description of the Related Art

Vehicle designers and manufacturers may include a sport mode that makes a vehicle feel more dynamic. In a sport mode, the vehicle switches to sportier settings that increase the vehicle's responsiveness. For example, the suspension may stiffen and power assistance to the steering may decrease at low and medium RPMs for more direct and immediate steering. This gives the driver an even closer sense of the character of the road. These sportier settings, however, may disrupt the sleep or comfort of occupants of the vehicle. Occupants may instead want more comfort to aid in sleeping or to reduce fatigue while travelling.

Accordingly, there is a need of a system and method of providing more comfort to occupants of a vehicle while travelling.

SUMMARY

In general, one aspect of the subject matter described in this specification may be embodied in a system for enhanced comfort prediction for a vehicle that includes one or more external databases connected through a network to the vehicle. The vehicle may include a navigation unit connected to the one or more external databases through the network for obtaining navigational map information and one or more sensors that monitor an environment of the vehicle. The vehicle includes a memory connected to the one or more sensors to store a route history and multiple comfort adjustable vehicle components connected to the memory. The multiple comfort adjustable vehicle components include a first comfort adjustable vehicle component and a second comfort adjustable vehicle component. The vehicle includes an electronic control unit that is coupled to at least the navigation unit, the one or more sensors, and the multiple comfort adjustable vehicle components. The electronic control unit is configured to obtain, from the navigation unit, navigational map information and vehicle information. The electronic control unit may determine a predicted route set and one or more predicted ride interruption events based on the vehicle information, the navigational map information, and the route history. The electronic control unit may detect a ride interruption event based on the one or more predicted ride interruption events and the predicted route set and send a first signal to the first comfort adjustable vehicle component that indicates to the first comfort adjustable vehicle component to operate in an enhanced comfort mode.

These and other embodiments may optionally include one or more of the following features. The electronic control unit may be configured to determine multiple potential predicted route sets based on the navigational map information and the vehicle information. The electronic control unit may be configured to determine one or more potential ride interruption events associated with each of the multiple potential route sets and select a respective potential predicted route set from the multiple potential predicted route sets as the predicted route set is based on a number of potential ride interruption events associated with the respective potential predicted route set. The electronic control unit may be configured to provide the predicted route set, a current location of the vehicle, and the one or more predicted ride interruption events to a user interface that may have one or more user interface elements. The user interface elements may correspond to a respective ride interruption event. The electronic control unit may receive a selection of one of the user interface elements and cancel the respective ride interruption event that corresponds to the selected user interface element. The electronic control unit may be configured to detect in the environment an enhanced comfort event and send a second signal that indicates to the second comfort adjustable vehicle component to operate in the enhanced comfort mode. The electronic control unit may be configured to obtain a user selection to enter a quiet mode. The user selection may indicate at least one of an internal quiet mode, an external quiet mode, and/or a total quiet mode. The electronic control unit may measure an internal noise level or an external noise level based on the user selection. The electronic control unit may send the first signal to the first comfort adjustable vehicle component based on the measurement and the user selection. The electronic control unit may send a second signal to the first comfort adjustable vehicle component to adjust a sensitivity of the enhanced comfort mode of the first comfort adjustable vehicle component. The sensitivity may be user configurable.

One or more comfort adjustable vehicle components may include at least one of an entertainment center, a vehicle suspension device, a noise cancellation device and/or an engine. The first comfort adjustable vehicle component may be a noise cancellation device and the first signal may activate the noise cancellation device.

In another aspect, the subject matter may be embodied in a method for an enhanced comfort mode for a vehicle. The method may include determining that the vehicle is moving and that the enhanced comfort mode is initialized. The method may include monitoring an environment of the vehicle for a first enhanced comfort event and detecting the enhanced comfort event based on the environment. The method may include sending one or more signals to one or more comfort adjustable vehicle components to adjust one or more settings of the one or more comfort adjustable vehicle components.

In another aspect, the subject matter may be embodied in a system for an enhanced comfort prediction system for an autonomous vehicle that includes one or more external databases connected through a network to the autonomous vehicle. The autonomous vehicle includes a navigation unit connected to the one or more external databases through the network for obtaining navigational map information and one or more sensors that monitor an environment of the vehicle. The autonomous vehicle includes multiple comfort adjustable vehicle components including a first comfort adjustable vehicle component and a second comfort adjustable vehicle component. The autonomous vehicle includes a memory connected to the multiple comfort adjustable vehicle components and the one or more sensors. The autonomous vehicle includes an electronic control unit that is coupled to at least the navigation unit, the one or more sensors, and multiple comfort adjustable vehicle components. The electronic control unit is configured to determine that the first comfort adjustable vehicle component is in an enhanced comfort mode and determine one or more conditions specific to a ride interruption event or an enhanced comfort event. The electronic control unit is configured to determine that the conditions are not present and send a first signal to the first comfort adjustable vehicle component to return to a default mode.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for predicting, preparing, and implementation of an enhanced quiet mode. Particular embodiments of the subject matter described in this specification may be implemented to realize one or more of the following advantages. Ride interruption events may be anticipated to place the vehicle in an enhanced comfort mode that provides additional comfort and quiet to the occupants of the vehicle. For example, the internal vehicle noise may be reduced and relaxing ambient noise may be played to aid an occupant's sleep or rest. By anticipating ride interruption events, the vehicle predicts a route that minimizes events that cause discomfort and provides enhanced comfort and quiet to the occupants while traveling. Additionally, the vehicle, in real-time, monitors the environment and adjusts settings in vehicle components to provide additional comfort and quiet to the occupants.

The added comfort improves the overall drivability and quality of the ride while reducing travel fatigue to the occupants of the vehicle. Improving the quality of the ride and reducing travel fatigue while traveling may increase alertness and awareness of the driver and occupants. Other benefits and advantages include the reduction in external distractions to the driver and/or the occupants of the vehicle while traveling. For example, while in the enhanced comfort mode, the suspension device of the vehicle may be softened to better handle road irregularities such as speed bumps and potholes. Another benefit or advantage may include a reduction in external vehicle noise that is generated. For example, as the vehicle approaches a residential neighborhood with a noise ordinance, the vehicle may reduce power to the engine to comply with the noise ordinance. The vehicle's compliance may also be adaptable to account for the time of day, e.g., the vehicle operates in a quieter mode at night when traveling through a neighborhood.

Figure 1:
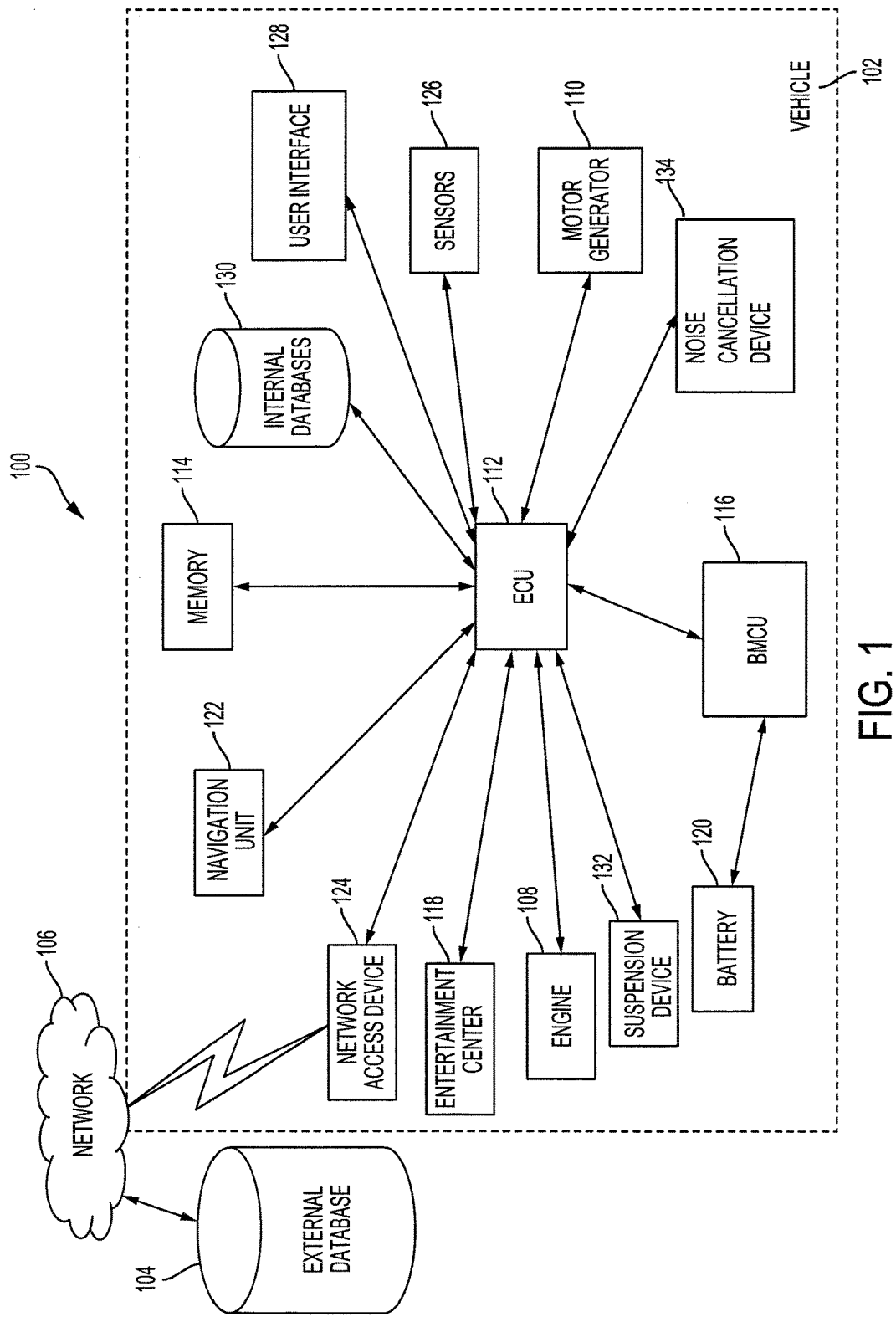
FIG. 1 is a block diagram of an example enhanced comfort prediction system of a vehicle according to an aspect of the invention.

FIG. 1 is a block diagram of an example enhanced comfort prediction system of a vehicle 102. The enhanced comfort prediction system 100 may include one or more computers or electronic control units (ECUs), appropriately programmed, to perform enhanced comfort prediction.

The enhanced comfort prediction system 100 includes a vehicle 102 that is coupled to a network 106 and one or more external databases 104. A vehicle, e.g., vehicle 102, is a conveyance capable of transporting a person or persons or any material or any permanently or temporarily affixed apparatus. A vehicle may be a self-propelled wheeled conveyance, such as a car, sport utility vehicle, truck, bus, van or other motor or battery driven vehicle. For example, the vehicle 102 may be an electric vehicle, a hybrid vehicle, a plug-in hybrid vehicle or any other type of vehicle that includes a battery 120 and/or a motor/generator 110. Other examples of vehicles include bicycles, trains, planes, or boats, and any other form of conveyance that is capable of transportation. A vehicle, e.g., vehicle 102, may be semi-autonomous or autonomous. That is, the vehicle 102 may be self-maneuvering and navigate without human input. An autonomous vehicle may use one or more sensors, e.g., the one or more sensors 126, and a navigation unit, e.g., the navigation unit 122, to drive autonomously.

The vehicle 102 may be coupled to a network 106. The network 106, such as a local area network (LAN), a wide area network (WAN), a cellular network, the Internet, or combination thereof, connects the vehicle 102 to the one or more external databases 104. The external databases 104 may include many databases from different service providers. A service provider may provide information to the vehicle 102.

Information provided by the service providers may include navigational map information, traffic condition information, or other information. The information may be stored in the one or more databases, e.g., external databases 104.

A database is any collection of pieces of information that is organized for search and retrieval, such as by a computer, and the database may be organized in tables, schemas, queries, reports, or any other data structures. A database may use any number of database management systems. An external database 104 may include a third-party server or website that stores or provides information. The information may include real-time information, periodically updated information, or user-inputted information. A server may be a computer in a network that is used to provide services, such as accessing files or sharing peripherals, to other computers in the network. A website may be a collection of one or more resources associated with a domain name.

Navigational map information may include political information and roadway information. Political information includes political features such as cities, states, zoning ordinances, laws and regulations, and traffic signs or signals. For example, laws and regulations may include the regulated speed on different portions of a road or noise ordinances. Roadway information may include road features, e.g., on-ramps, highways, tunnels, bridges, a curvy road, a straight road or a mountainous road. Roadway features may also include information on potholes, speed bumps, and inclination of a roadway.

Traffic condition information includes one or more traffic condition features. The traffic condition information may include information related to the density and movement of vehicles on a roadway, construction information, accident information, or information about vehicles in public/private structures that typically have congestion during specific hours or after specific events. Traffic condition features may include traffic congested areas, construction areas, or accident areas. Features, e.g., roadway features, political features, or traffic condition features, each have a location that may be identified by map coordinates.

The vehicle 102 includes features that allow it to learn the driver's routes over time so that future routes and ride interruption events may be predicted. The vehicle 102 may include an engine 108, a motor/generator 110, an electronic control unit (ECU) 112, a memory 114, a battery management and control unit (BMCU) 116, an internal database 130, a suspension device 132, an entertainment center 118, a noise cancellation device 134, and a battery 120. The vehicle 102 may also include a navigation unit 122, a network access device 124, one or more sensors 126, and a user interface 128.

The motor/generator 110 may convert electrical energy into mechanical power, such as torque, and may convert mechanical power into electrical energy. The motor/generator 110 may be coupled to the battery 120. The motor/generator 110 may convert the energy from the battery 120 into mechanical power, and may provide energy back to the battery 120, for example, via regenerative braking. In some implementations, the vehicle 102 may include one or more additional power generation devices such as the engine 108 or a fuel cell stack (not shown). The engine 108 combusts fuel to provide power instead of and/or in addition to the power supplied by the motor/generator 110.

The battery 120 may be coupled to the motor/generator 110 and may provide electrical energy to and receive electrical energy from the motor/generator 110. The battery 120 may include one or more rechargeable batteries.

The BMCU 116 may be coupled to the battery 120 and control and manage the charging and discharging of the battery 120. The BMCU 116, for example, may measure, using battery sensors (not shown), parameters used to determine the state of charge (SOC) of the battery 120.

The ECU 112 may be electrically coupled to some or all of the components of the vehicle 102. The ECU 112 may include one or more processors or controllers specifically designed for automotive systems. The functions of the ECU 112 may be implemented in a single ECU or in multiple ECUs. The ECU 112 may receive data from one or more components and control the operation of the one or more components based on the received or determined data. For example, the ECU 112 may receive data from a navigation unit 122, one or more sensors 126, and a network access device 124 and integrate the data received from each of the devices to output a display on a user interface 128. The ECU 112 may control the operations of the BMCU 116 to charge or discharge the battery 120.

The memory 114 may be coupled to the ECU 112. The memory 114 may store instructions to execute on the ECU 112 and may include one or more of a RAM or other volatile or non-volatile memory. The memory 114 may be a non-transitory memory or a data storage device, such as a hard disk drive, a solid-state disk drive, a hybrid disk drive, or other appropriate data storage, and may further store machine-readable instructions, which may be loaded and executed by the ECU 112.

The ECU 112 may be coupled to one or more sensors 126 that detect various internal or external environmental parameters. Sensors may include units and/or devices of the vehicle 102, such as a motion detector, a facial recognition sensor, a microphone to detect noise, a vibration sensor or a noise measurement sensor.

The ECU 112 may be coupled to one or more comfort adjustable vehicle components. Comfort adjustable vehicle components are vehicle components that affect the drivability of the vehicle or the comfort of individuals in or surrounding the vehicle. The comfort adjustable vehicle components may include the suspension device 132, the engine 108, the power steering, a noise-cancellation device 134, mirrors, the windows, or the one or more entertainment centers 118, e.g., a television, gaming system, or audio player.

The navigation unit 122 may include a GPS unit (not shown) for detecting location data and date/time information. The navigation unit 122 may provide navigation instructions based on the detected location data and may include a memory (not shown) for storing route data. The navigation unit 122 may receive data from other sensors capable of detecting data corresponding to location information. For example, the other sensors may include a gyroscope or an accelerometer.

In some implementations, the navigation unit 122 includes a processor for predicting routes or a route set based on location data detected by the GPS, a current day of the week, a current date, a current time and/or other factors. In other implementations, the ECU may predict a route set that includes at least two predicted routes.

The navigation unit 122 may be integral to the vehicle 102 or a separate unit coupled to the vehicle 102, such as a personal device with navigation capability. When the navigation unit 122 is separate from the vehicle 102, the navigation unit 122 may communicate with the vehicle 102 via the network access device 124. In some implementation, the vehicle 102 may include a GPS unit instead of the navigation unit 122. In that regard, the ECU 112 may perform the functions of the navigation unit 122 based on data received from the GPS unit. At least one of the navigation unit 122 or the ECU 112 may predict a route set that includes at least two predicted routes. The route set may be predicted based on previously detected data, the current location, the current time of day, the current date, and/or the current day of the week. Navigation functions may be performed by the navigation unit 122 or the ECU 112. Navigation functions may include, for example, route and route set prediction, providing navigation instructions, and receiving user input such as verification of a predicted route, predicted route set, or destination.

The navigation unit 122 may include a user interface separate from the user interface 128 and/or may communicate via the user interface 128. The user interface 128 may be a personal device, e.g., a mobile phone, a tablet, a personal computer, that is connected to the ECU 112 through the network access device 124 across a network 106. The user interface 128 may include any device capable of receiving user input, such as a button, a dial, a microphone, or a touch screen, and any device capable of output, e.g., a display, a speaker, or a refreshable braille display. The user interface 128 allows a driver or passenger of the vehicle 102 to communicate with the ECU 112. For example, the driver may be able to provide data to the ECU 112 and/or receive feedback from the ECU 112 via the user interface 128.

The network access device 124 may include a communication port or channel, such as one or more of a Wi-Fi unit, a Bluetooth® unit, a radio frequency identification (RFID) tag or reader, or a cellular network unit for accessing a cellular network (such as 3G or 4G). The network access device 124 may transmit data to and receive data from devices and systems not directly connected to the vehicle 102. For example, the ECU 112 may communicate with the external databases 104. Furthermore, the network access device 124 may access the network 106, to which the external databases 104 are also connected.

The ECU 112 may predict a route or route set of the vehicle 102 based on one or more factors including a current location, a current time, a current date, a current day of the week, or a route history. For example, if the driver leaves for work at 8:00 a.m. every weekday and then drives home at 5:00 p.m. every weekday, the ECU 112 may predict that the vehicle 102 is going to travel to the driver's work place at 8:00 a.m. and return to the driver's house at 5:00 p.m. Moreover, if the driver takes the same route to work every weekday, the ECU 112 may store the route, e.g., in an internal database 130.

The internal database 130 coupled to the ECU 112 may store a route or a route set driven by a driver. The internal database 130 may associate different parameters with a route set. Examples of different parameters include an identity of the driver, time and date information, and route information. Other parameters may include driver behavior and traffic conditions, and any other parameters obtained by the sensors 126, the navigation unit 122, the user interface 128, or the network 106. For example, if "John Doe" drives to work at 8:00 a.m. every weekday and takes I-5 North and 55 South to work, the internal database 130 may associate "John Doe", "8:00 A.M. on weekdays," with the route "I-5 North and 55 South." The internal database 130 may provide a route history including the stored route information to the ECU 112 for route prediction.

Figure 2:
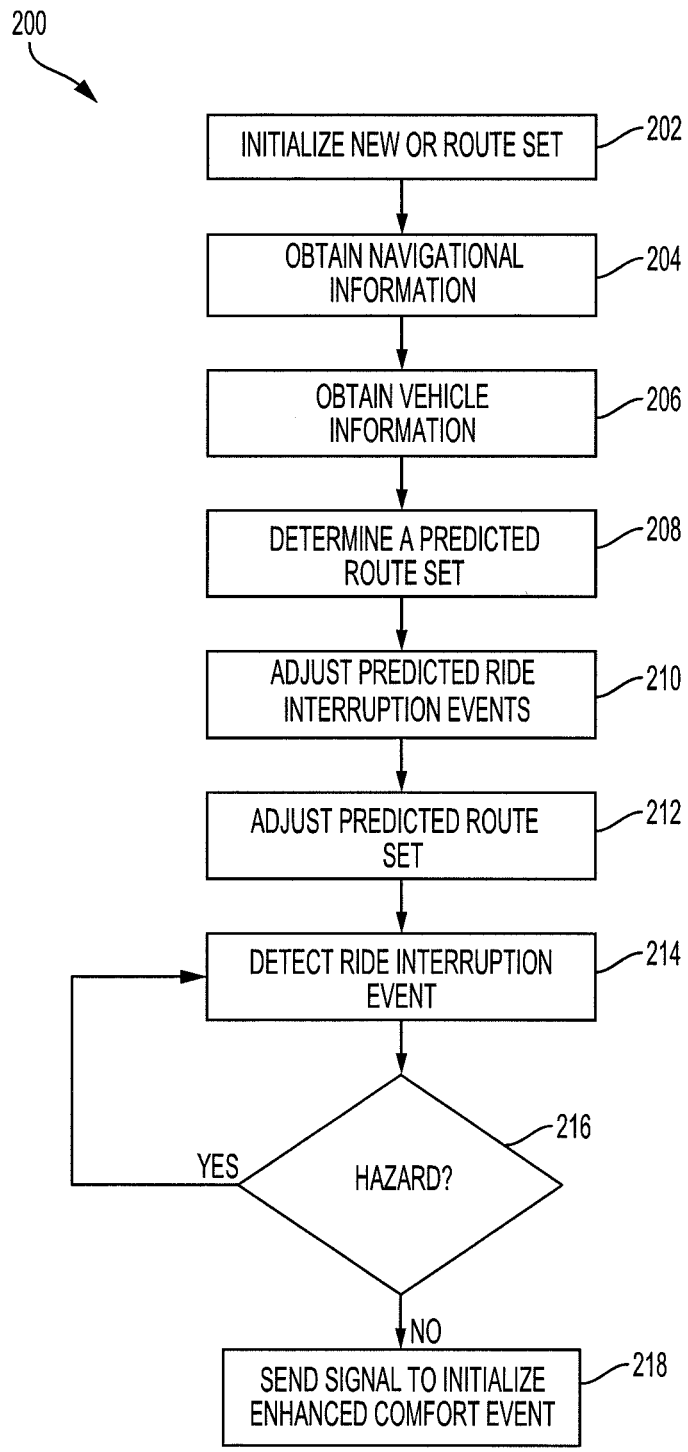
FIG. 2 is a flow diagram of an example process for predicting a route set including one or more ride interruption events according to an aspect of the invention.

FIG. 2 is a flow diagram of an example process 200 for predicting a route set including one or more ride interruption events. One or more computers or one or more data processing apparatuses, for example, the ECU 112 or the navigation unit 122 of the enhanced comfort event prediction system 100 of FIG. 1, appropriately programmed, may implement the process 200.

The system may initialize a new route or route set based on an indication that the vehicle is operational (202). For example, when the vehicle 102 is powered on, when the vehicle 102 begins initial movement after being powered on, when the user interface 128 of the vehicle is activated, or when the navigation unit 122 is activated, the system may initialize a new route or route set. The system may use one or more sensors 126 or the navigation unit 122 to detect one or more vehicle operations. In some implementations, a user interface 128 may receive user input, such as a starting address, that may indicate the beginning of a new route.

The system may determine whether the enhanced comfort mode is initialized. The system may receive, from the user interface 128, user input that indicates initialization of the enhanced comfort mode. If the system receives user input indicating the initialization of the enhanced comfort mode, the system may proceed with predicting the route set, one or more ride interruption events, and/or one or more enhanced comfort events.

The enhanced comfort mode may be a quiet mode and the user input may indicate at least one of an internal quiet mode, an external quite mode and/or a total quiet mode.

In some implementations, the system may proceed with detecting an enhanced comfort event or ride interruption event without predicting the route set. In other implementations, the system may adjust one or more comfort adjustable vehicle components to provide enhanced comfort and quiet without attempting to detect ride interruption events or enhanced comfort events based on the user activation of the enhanced comfort mode. The adjustment may be based on user-configurable settings or a default setting that initializes all the comfort adjustable vehicle components. If the system does not determine that the enhanced comfort mode is initialized, the vehicle proceeds with normal operation. The user interface 128 is further described below in reference to FIGS. 6-7.

In some implementations, the system obtains navigational map information for the vehicle 102 (204). The system may receive the navigational map information from an external database 104, such as from a server of a navigational map provider or an online map service, or from a user interface 128, e.g., a personal mobile device connected through a network 106. The system may extract information including roadway information and political information from the navigational map information. The roadway information may include one or more road features and the political information may include one or more political features. The features may be associated with map coordinates included and extracted from the navigational map information.

In some implementations, the system retrieves the navigational map information from a memory device, internal and/or external to the vehicle. For example, the system may access the memory 114 to retrieve navigational map information. In another example, the system uses the network access device 124 to access an external medium or an external database 104 to obtain the navigational map information. Other sources that the system obtains the navigational map information from include user-inputted devices or other computer readable medium, e.g., a flash drive or a Universal Serial Bus (USB) memory stick.

The system obtains vehicle information of the vehicle 102 (206). Vehicle information includes the current speed of the vehicle, the current date and the current time. The navigation unit 122 may have a Global Positioning Satellite (GPS) device that provides the, speed, and time and date information. The system may have one or more sensors 126, e.g., cameras, on the exterior of the vehicle to perform photo recognition of the exterior environment to determine the current location of the vehicle. Using the vehicle information and navigational map information, the system may associate the current location with a place. For example, the system may receive the map coordinates of the vehicle and identify the location as John Doe's residence by associating the coordinates with public records from an external database 104 or learned information.

In some implementations, the system may obtain the vehicle information from one or more sensors 126 or an internal clock. For example, the system may obtain the vehicle's speed from a vehicle speed sensor or time from the internal clock. In other implementations the system may obtain the vehicle information from user input, e.g., the system may obtain current time/date information set by a user through a user interface 128. The current time/date may be initialized or pre-set at the factory and may be updated based on user input, the navigational map information, or by connecting to a network 106 through the network access device 124.

The system may determine an identity of one or more occupants of the vehicle, by requesting and/or receiving user input, through a user interface 128. Other forms of user input may include the selection of a button, for example, a memory button on the seat that identifies a specific driver of the vehicle 102, or voice activation. The system may identify the occupants through the connection of one or more personal devices, such as a key fob or a smartphone, to the network access device 124. The system may identify one or more occupants using the one or more sensors 126, e.g., a microphone to identify the occupants of the vehicle 102 through voice recognition. For example, John and Jane enter the vehicle 102, and by monitoring the conversations, the system may identify that Jane is with John and Jane is the driver. The system may store the preferences and associate the preferences with the identity of the occupants or predicted route set in an internal database 130.

The system may determine a predicted route or a predicted route set based on a number of ride interruption events (208). A route is a path with a starting location and a destination location. The starting location may be the current location of the vehicle or user-inputted. The destination location may be user-inputted or predicted using a route history that stores traveled routes. A route set is one or more routes. A ride interruption event is an event that may cause discomfort to an occupant of the vehicle, e.g., a speed bump, a stop sign, a pothole, a noise ordinance zone, or a traffic-congested area. Ride interruption events may cause an occupant to wake-up because of a noise or a sudden disturbance in a smooth ride.

The system may determine the predicted route set based on navigational map information, vehicle information, a route history, or identity of the occupants or driver in the vehicle. To determine the predicted route or route set with the least number of ride interruption events, the system may identify multiple potential predicted route sets and ride interruption events associated with the potential predicted route sets. The system may obtain a starting location of the vehicle from the navigation unit 122 or from user input through the user interface 128. The system may determine a destination location from a route history based on the starting location and the current time. The system may determine one or more potential predicted route sets based on the driver's identity or driving patterns stored in the route history. For example, the vehicle may use the route history to determine that "John Doe" travels to and from work along the same path every weekday morning and evening so if the vehicle is initialized on a weekday morning that path is one of the potential predicted routes. In some implementations, the system may use a map service or a routing program along with the location of the vehicle and the destination location to determine one or more potential predicted route sets.

In some implementations, the system may identify a potential predicted route set from a personal device. For example, individuals have an electronic device having a stored calendar or may have a calendar stored in the cloud. The system may communicate with the personal electronic device or the cloud via a network access device 124. The system may be capable of predicting a route or a route set based on data received from the calendar. For example, the calendar may include appointments at various locations throughout the day that the system includes as destinations along the predicted route set.

The system may identify the ride interruption events along the potential predicted route sets by extracting the roadway, political, and other features from the navigational map information, and comparing the features of the potential predicted route set with features identified as ride interruption events in the internal database 130. Ride interruption events are events that may cause discomfort to an occupant or cause interruption to the smooth operation of a vehicle 102. Ride interruption include speed bumps, stop-signs, curvy roads, pot holes, noise ordinances and other features that may cause discomfort to the occupants during normal operation of the vehicle 102. For example, the system may determine that at a particular location there is a noise ordinance between particular hours and may classify that location as a ride interruption event during those hours. In some implementations, the system may identify the ride interruption events using the route history. For example, the system may store in the route history a speed bump that the vehicle traverses on a route.

The system may select the potential predicted route set based on the number of ride interruption events as the predicted route set. For example, the system may select the potential predicted route that has the least number of ride interruption events, e.g., stop signs, speed bumps, and other roadway and political features, which may disturb a sleeping infant to avoid waking up the sleeping infant. In some implementations, the system displays one or more potential predicted route sets and the one or more ride interruption events along the corresponding route sets to the user through a user interface 128. The system may receive a selection of one of the potential predicted route sets from the user and use the selected route as the predicted route set.

In some implementations, the system may assign different weighting factors to each criterion in determining the predicted route set and based on a cumulative score select the predicted route set. For example, the system may weight each ride interruption event along a potential predicted route set differently based on the type of ride interruption event. The weighting factor for the type may be user configurable. The system may adjust or update the one or more ride interruption events along each of the potential predicted route set before selection of the predicted route set (210). In some implementations, the system may adjust or update the one or more ride interruption events of the predicted route after selection of the predicted route. The system may adjust or update ride interruption events using traffic condition information obtained in real-time or periodically from the external databases 104. For example, the system may add a ride interruption event at the location of a traffic jam.

The system may obtain information that may indicate that there is surrounding traffic or that the vehicle is travelling through a busy downtown, and compare the obtained information to a threshold value. For example, if the obtained information indicates that a road is congested because the number of vehicles at a particular location is greater than or equal to a threshold value or percentage, the system may add an additional ride interruption event at the location of the traffic congestion and update the one or more potential predicted route sets and/or the predicted route set.

The system may adjust the potential predicted route set based on real-time or periodically obtained information received from the network 106, using one or more of the external databases 104 (212). For example, the system may receive traffic condition information from an external service or database connected to the network or a personal device, and if there is an accident, traffic or construction, the system may identify an alternative predicted route set or update the existing predicted route set. In some implementations, the system updates the potential predicted route set before the predicted route set has been selected.

The system may display the predicted route set and/or the predicted ride interruption events on the user interface 128. The system may request feedback from the user indicating whether the predicted route set and/or ride interruption events are accurate. The predicted route set may be validated by user confirmation and/or traversing the predicted route. The route history may keep track of the number of times the route set is predicted and the number of times the user confirms the accuracy of the predicted route set and/or the number of times the vehicle traverses the entire predicted route set.

The system may determine a confidence value for a predicted route set. The confidence value for the predicted route set may be based on the route history and may be a ratio or a comparison of the number of times the route set was identified as a predicted route set and the number of times the predicted route set was validated. The confidence value may be compared to a confidence value threshold to determine if the confidence value is greater than the confidence value threshold. The system may tailor the predicted route set based on the comparison. If the confidence value is not above the confidence value threshold and the prediction was not validated by the driver, the system may alter the predicted route set.

The system may detect that the vehicle is approaching a ride interruption event (214). The system may detect the vehicle is approaching the ride interruption event using the predicted route set, navigational map information, and/or vehicle information by obtaining a current location of the vehicle and comparing the current location of the vehicle to the location of one or more predicted ride interruption events. The vehicle may identify an approaching ride interruption event by determining that one of the predicted ride interruption events is within a threshold distance of the location of the vehicle.

In some implementations, the vehicle may identify that the vehicle is approaching the ride interruption event by calculating the time a vehicle will take to reach the ride interruption event using the speed of the vehicle and an estimated distance to the predicted ride interruption event calculated using the vehicle and navigational map information. If the time is below a threshold value, the system may identify the predicted ride interruption event as an approaching ride interruption event. In some implementations, the system identifies that the distance between the location of the vehicle and a predicted ride interruption event is continually decreasing and that the predicted ride interruption event is the next ride interruption event along the predicted route set. The predicted ride interruption events may be ordered in a list based on the path of the predicted route set to determine the next ride interruption event.

In some implementations, the system may not determine a predicted route set and/or one or more predicted ride interruption events. The system may detect approaching ride interruption events as the vehicle 102 travels from one location to another using the navigational map information, vehicle information and/or road condition information. A driver, for example, may select on the user interface 128 to disable route prediction but enable the enhanced comfort mode, and so, as the vehicle 102 approaches a feature that corresponds to a ride interruption event, the system may adjust the settings of one or more comfort adjustable vehicle components.

The system may determine whether the one or more adjustments may cause a potential hazard (216), and if so, determine not to send a signal to make the adjustment. For example, if the vehicle is in motion in a traffic-congested area, the system may not restrict power to the engine. In another example, if the vehicle is travelling at night, the system may not tint the windows.

In some implementations, the system may receive user input to override a setting that was adjusted by the system, and in response to the user input, the system may cancel the adjustment or return the comfort adjustable vehicle component to a default or normal state. For example, a user may select a user interface element on the user interface 128 that cancels the restriction of power to the engine. The system may store the override action in a route history and associate the override action with a location of a ride interruption event to assist in prediction of ride interruption events.

The system may send one or more signals to the one or more comfort adjustable vehicle components to initialize the enhanced comfort mode based on the ride interruption event (218). A signal adjusts the settings of a respective comfort adjustable vehicle component to enhance the comfort of the occupants. A comfort adjustable vehicle component is a vehicle component that may be adjusted to reduce distractions to occupants of the vehicle or provide additional comfort to the occupants. Comfort adjustable vehicle components include an entertainment center 118, such as a CD player, a radio, or a television, the suspension device 132, the noise cancellation device 134, windows, the engine 108, mirrors, windows, or the turbocharger. Adjustable settings include making deceleration or acceleration of the vehicle more gradual, tinting of the windows or mirrors, restricting power to the engine to reduce noise, cancelling external noise, and playing ambient music in the interior of the vehicle. The system may send the one or more signals to the one or more comfort adjustable components based on user-configurable settings and parameters that determine the response associated with a respective ride interruption event. The system may send one or more additional signals to the respective ride interruption event to configure the sensitivity of the response. The sensitivity of the response may be user configurable.

For example, a noise cancellation device in the interior of the vehicle may cancel out external noises so that an occupant inside the vehicle may sleep. In another example, the suspension system vehicle may be softened to allow the vehicle to travel roadways and across bumps with less disturbance to the occupants. Other examples include the windows tinting, the engine reducing power, or the turbocharger spooling only after receiving an acceleration input. The system may also cause the entertainment center 118 to emit ambient sound or music to assist in sleeping.

In some implementations, the system initializes the enhanced comfort mode based on the environment. Initialization of the enhanced comfort mode in response to the environment is further described in FIG. 3.

The system may detect that the vehicle has reached the destination location by comparing the current location of the vehicle or other vehicle information with the predicted route set. In response to detecting that the vehicle has reached the destination location, the system may store the predicted route set including the realized ride interruption events, the identity of the occupants of the vehicle, and other information including driver behavior patterns, in a route history.

Figure 3:
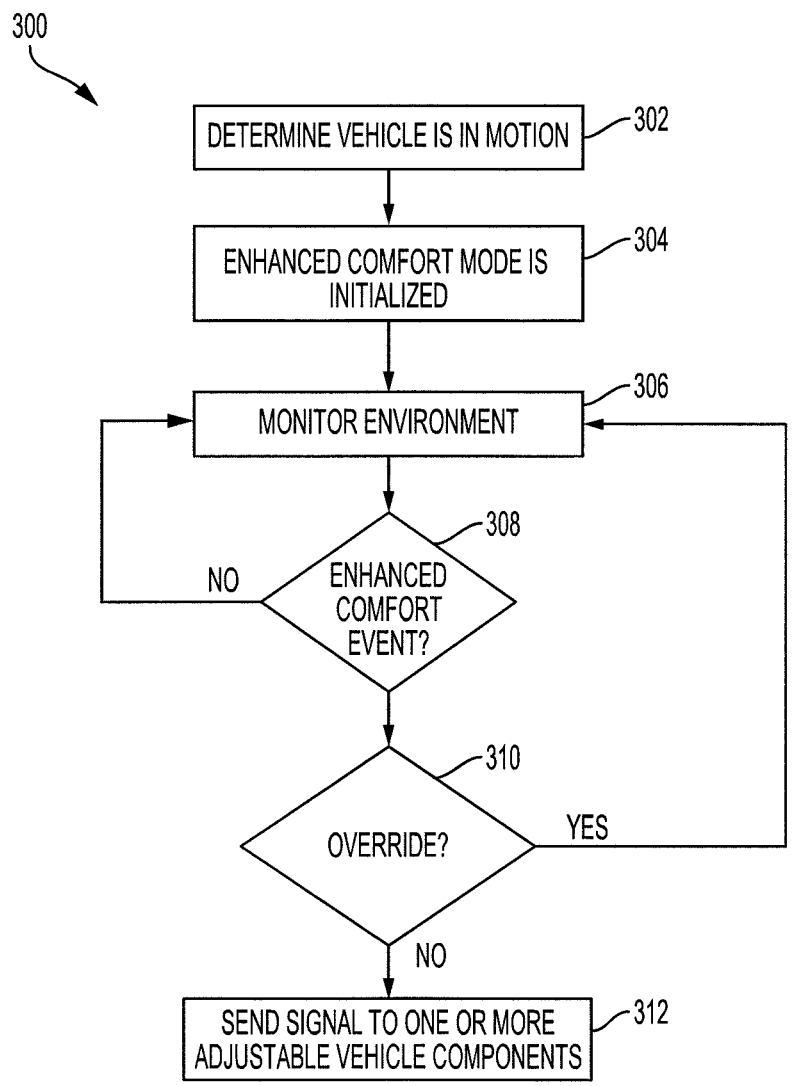
FIG. 3 is a flow diagram of an example process for initializing an enhanced comfort mode in response to an environment according to an aspect of the invention.

FIG. 3 is a flow diagram of an example process 300 for initializing an enhanced comfort mode in response to the environment. One or more computers or one or more data processors, for example, the ECU 112 or the navigation unit 122 of the enhanced comfort event prediction system 100 of FIG. 1, appropriately programmed, may implement the process 300.

The system may determine that the vehicle is in motion (302). That is, the vehicle 102 is traveling to a destination. The vehicle 102 may or may not be traveling a predicted route set or to a determined destination. The system may determine that the vehicle 102 is in motion from the vehicle information obtained from the navigation unit 122 or from one or more sensors 126. In some implementations, the system receives an indication from a vehicle speed sensor that the vehicle is traveling at a speed greater than or equal to a threshold value, such as 1 mph to determine that the vehicle is in motion. In other implementations, the system compares a distance between a first location of the vehicle 102 and a second location of the vehicle 102 to a threshold value, the first location determined at time $t_o$ and the second location determined at time $t_1$, using the GPS device of the navigation unit 122 to determine that the vehicle is in motion. For example, if the distance between the first location and the second location is greater than or equal to a threshold distance, the system may determine that the vehicle 102 is in motion.

The system may determine whether the enhanced comfort mode is initialized, and if the system is initialized, obtain navigational map information and vehicle information, as described above (304).

The system may monitor the environment for an enhanced comfort event (306). The environment includes the surroundings of both the interior and exterior of the vehicle 102. The system may use one or more sensors 126 to monitor the environment including taking one or more measurements of various factors of the interior or exterior of the vehicle. The various factors include noise levels, vibration levels of the vehicle 102, or the volume level of the entertainment center 118. For example, one or more microphones may measure the noise level internal or external to the vehicle 102, or the one or more sensors 126 may use facial recognition technology to identify when an occupant is fatigued by comparing the facial features of the occupants with pre-stored data related to their facial features. In another example, the system may monitor the entertainment center 118 and detect volume adjustments. A continuously increasing volume adjustment may indicate that there is background noise in the interior of the vehicle 102.

The system may detect an enhanced comfort event based on the environment (308). The system may compare measurements taken from the environment and a threshold value to detect an enhanced comfort event. For example, a noise measurement of the environment outside the vehicle may have a decibel level greater than or equal to 60 dB, which is the typical external ambient noise level, and trigger the enhanced comfort event. In another example, the system may detect an enhanced comfort event when an interior noise measurement of the environment that indicates a sleeping infant has awakened or is crying. The enhanced comfort event may be of a particular type, such as an event to reduce the internal noise or the vibration of the vehicle.

The system may determine whether the enhanced comfort event is overridden (310). The system may receive user input from a user that overrides the enhanced comfort event and cancels implementation of any adjustments associated with the enhanced comfort event. A user may override or cancel the enhanced comfort event by disabling the enhanced comfort event through the user interface 128.

In some implementations, the system may calculate a confidence level based on the number of times the enhanced comfort event has been detected in the past and the number of times the enhanced comfort event was cancelled or overridden. The confidence level may be associated to the route and stored in a route history to be used to predict comfort events.

The system may send a signal to one or more comfort adjustable vehicle components. The system may send the signal to the one or more adjustable vehicle components based on the detected enhanced comfort event and/or potential hazards as described above (312). The one or more adjustable vehicle components that the system sends the signal to may be based on the particular type of the enhanced comfort event. For example, in response to detecting that the external noise is greater than or equal to a threshold value, the system may send a signal to the internal noise cancellation device to cancel out the exterior noise so that occupants may be able to sleep, and the system may send a second signal to the engine to operate with less power to reduce the engine noise to comply with a noise ordinance.

Figure 4:
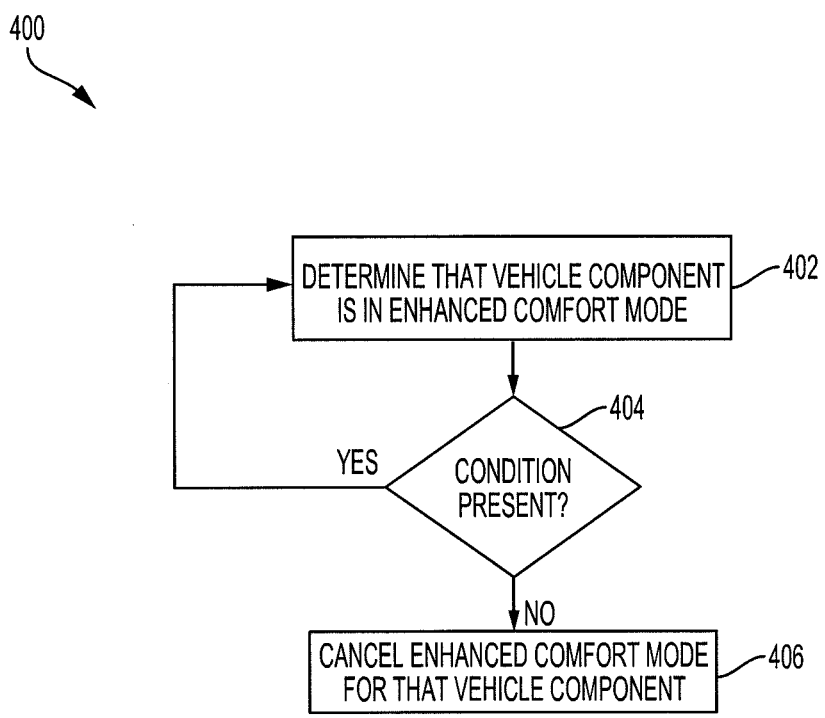
FIG. 4 is a flow diagram of an example process for cancelling one or more adjustments made to one or more adjustable vehicle components according to an aspect of the invention.

FIG. 4 is a flow diagram of an example process for cancelling one or more adjustments made to one or more adjustable vehicle components. One or more computers or one or more data processing apparatuses, for example, the ECU 112 or the navigation unit 112 of the enhanced comfort prediction system 100 of FIG. 1, appropriately programmed, may implement the process 400.

The system determines that one or more comfort adjustable vehicle components are operating in an enhanced comfort mode (402). When the system sends one or more signals to the one or more comfort adjustable vehicle components based on an enhanced comfort event or ride interruption event, the system may store in the memory 114 or in the internal database 130, an indication that the one or more adjustable vehicle components are in the enhanced comfort mode. The system may then determine the state of the comfort adjustable vehicle component by checking the memory 114 or the internal database 130. In some implementations, the system may obtain from the one or more adjustable vehicle components, an indication that the components are operating in an enhanced comfort mode.

The system determines whether one or more conditions associated with the ride interruption event or the enhanced comfort remains present (404). If the system determines that conditions of the ride interruption event or the environmental factors in the environment that triggered the enhanced comfort event remain present, the system remains in a wait state until the conditions are not present. If the system determines that the conditions are not present, the system proceeds with cancelling or waking up from the enhanced comfort mode (406).

The system may cancel or wake-up from the enhanced comfort mode by sending one or more signals to the respective comfort adjustable vehicle components to have the comfort adjustable vehicle components enter normal operation. The one or more conditions are specific to the particular ride interruption event or the environment. For example, when detecting whether an occupant is falling asleep, a condition may be identifying facial features that are consistent with a tired occupant. If the facial features of the occupant indicate that the occupant is tired, the system may continue playing the ambient noise to assist the occupant in getting rest. If the facial features indicate that the occupant is awake and not tired, the system may proceed with cancelling or waking up from the enhanced comfort mode. Other conditions may include noise levels, vibration levels, or the location of the vehicle 102.

With ride interruption events, the system may cancel or wake-up from the enhanced comfort mode after realization of the ride interruption event, e.g., when the vehicle 102 travels a threshold distance away from the location of the ride interruption event. The system may calculate the distance between the current location of the vehicle 102 and the location of the ride interruption event and if the distance is increasing and greater than or equal to a threshold value, the system may determine that the ride interruption event was realized. For example, if the ride interruption event is a stop sign and one or more of the signals caused the engine to decelerate or accelerate more gradually, the system may indicate to the engine to operate normally without the gradual acceleration and/or deceleration after the vehicle 102 is a threshold distance away from the location of the stop sign.

With enhanced comfort events, the system identifies that the conditions in the environment that caused the initialization of the enhanced comfort mode are not present, and in response, the system re-adjusts the comfort adjustable vehicle components to resume normal operation. For example, if the system activates the noise cancellation device in response to the external noises exceeding a threshold decibel level outside the vehicle, such as when the vehicle encounters downtown traffic, the system may de-activate the noise cancellation device when the noise outside the vehicle is no longer present, such as when the vehicle exits onto a quiet country road.

Figure 5:
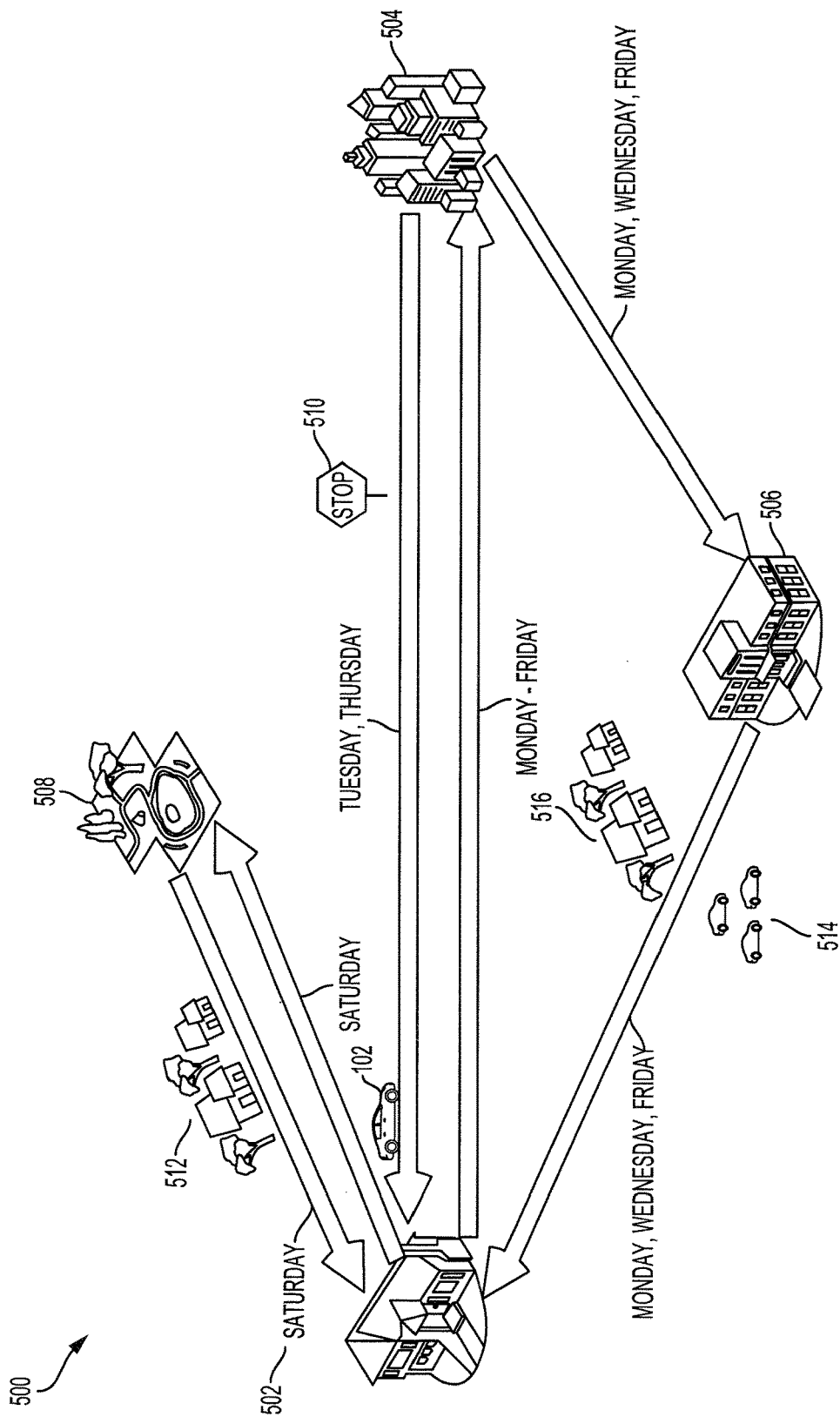
FIG. 5 shows an example map of route sets traveled by the vehicle of FIG. 1 according to an aspect of the invention.

FIG. 5 shows an example map 500 of route sets traveled by the vehicle 102 of FIG. 1. One or more computers or one or more data processing apparatuses, for example, the ECU 112 or the navigation unit 122 of the enhanced comfort prediction system 100 of FIG. 1, appropriately programmed, may implement the example route sets.

Map 500 illustrates various routes and route sets traveled by the vehicle 102. As shown, the vehicle 102 travels from a house 502 to a workplace 504 every Monday through Friday by "John Doe". On Tuesdays and Thursdays, the vehicle 102 travels back from the workplace 504 to the house 502. On Mondays, Wednesdays, and Fridays, the vehicle 102 travels from the workplace 504 to a school 506, to pick up a child, and then from the school 506 to the house 502. On Saturdays, the vehicle 102 may be driven by "Jane Doe" and travels from the house 502 to a park 508 and then from the park 508 to the house 502.

As shown, the first route set is performed on Tuesdays and Thursdays and includes a route from the house 502 to the workplace 504 and a route from the workplace 504 to the house 502. The vehicle 102 is driven by "John Doe" and stops at a stop sign 510 while travelling from the house 502 to the workplace 504 and back. The system may pre-determine that there is a predicted ride interruption event at the location of the stop sign 510 when traveling to work. The system may learn that "John Doe" takes this route every Tuesday and Thursday so when "John Doe" starts the vehicle, the vehicle may identify the first route set including the ride interruption event located at the location of the stop sign 510 as the predicted route.

The second route set occurs on Saturdays and includes a route from the house 502 to the park 508 and a route from the park 508 to the house 502. The system may learn that "Jane Doe" takes this route every Saturday at 9 a.m. and stays at the park until 9 p.m. when she travels back home. The route may include traveling through a neighborhood 512 that has a nighttime noise ordinance. The system may pre-determine that there is a ride interruption event at the location of the neighborhood 512 at 9 p.m. but not at 9 a.m.

The third route set, on Monday, Wednesday, and Friday, includes three routes. The first route is from the house 502 to the workplace 504, the second route is from the workplace 504 to the school 506 and the third route is from the school 506 to the house 502. The route may include travelling through a neighborhood 516 with a noise ordinance. The system may identify a ride interruption event at the neighborhood 516. In some implementations, the system may determine that restricting power to the engine 108 to reduce noise in the neighborhood 516 with the noise ordinance is not desirable because there is traffic congestion 514, so the system does not send a signal to the engine 108 to reduce power.

Figure 6:
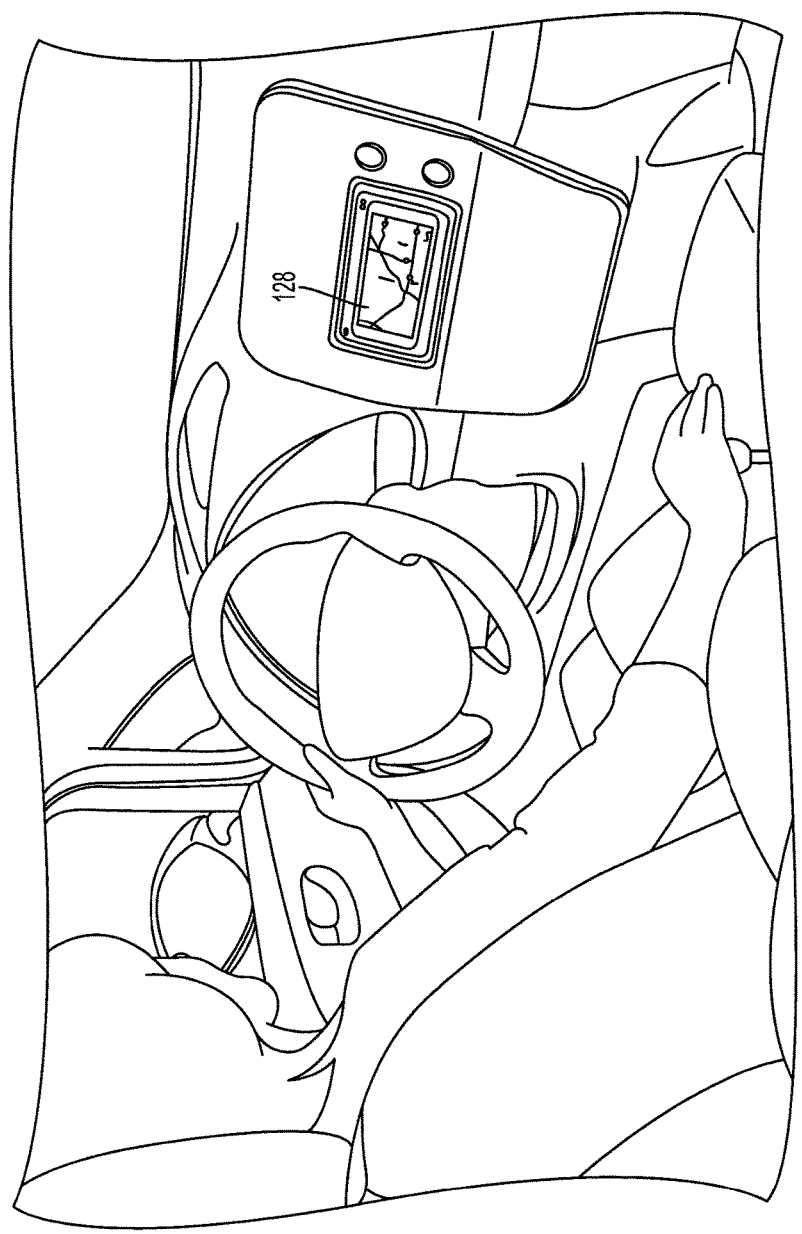
FIG. 6 shows an example interior view of the vehicle of FIG. 1 including a user interface according to an aspect of the invention.
Figure 7:
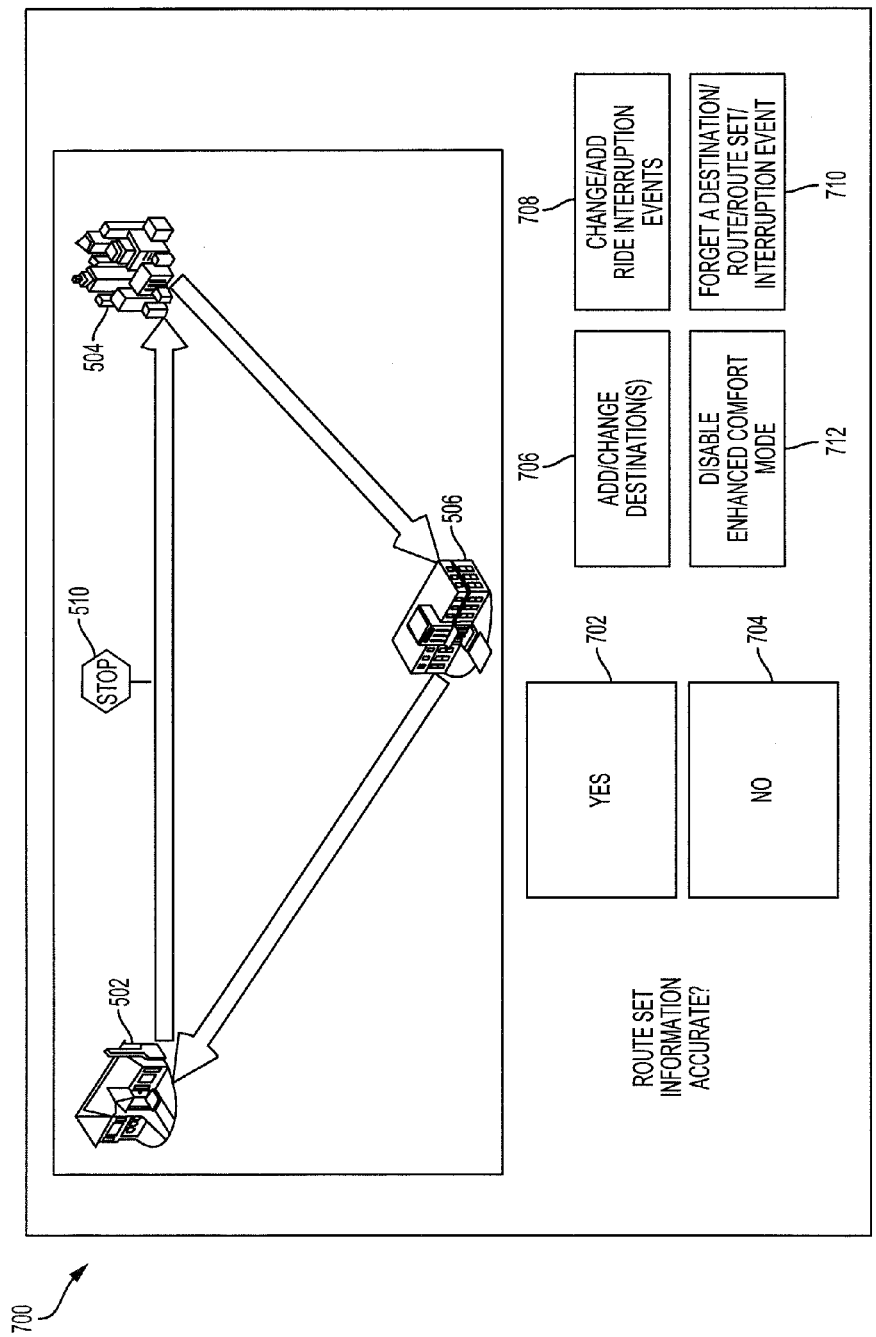
FIG. 7 shows example information provided by the user interface of FIGS. 1 and 6 according to an aspect of the invention.

FIG. 7 shows example information provided by the user interface 128 of FIGS. 1 and 6. One or more computers or one or more data processing apparatuses, for example, the ECU 112 or the navigation unit 122 of the enhanced comfort prediction system 100 of FIG. 1, appropriately programmed, may interface with the driver using the user interface 128.

The user interface 128 may output various data and receive various inputs from the driver. For example, as the driver enters the vehicle and turns the vehicle on while at the house 302, the system may predict the route set. Assuming the day is a Monday, a Wednesday or a Friday, the system may predict the third route as shown on the user interface 128. The system may cause the user interface 128 to output data requesting verification of whether the predicted route set is accurate. The driver may be able to confirm or deny the accuracy of the predicted route set or predicted ride interruption events using a "yes" button 702 and a "no" button 704. The user interface 128 may display time/distance information for the predicted route set and the time/distance difference between the predicted route set and the most efficient route.

The user interface 128 may also include a button 706 corresponding to an option to add or change destinations. The system may also provide a button 708 corresponding to an option to change or add ride interruption events. The system may also provide a button 710 corresponding to an option to forget a destination, a predicted route and/or a route set, or a predicted ride interruption event. The system may also provide a button 712 corresponding to an option to disable the enhanced comfort mode.

The driver may occasionally decide to take a different route from one place to another, to add a destination to a route set, to take a different trip than usual for a particular day or time, or to disable the ride interruption event prediction. For example, by selecting the button, the driver may cause the system to disable the prediction of route sets and/or all ride interruption events. In some implementations, the system may have one or more buttons or a touch screen on the user interface to implement the functions of the buttons, e.g., a selection by the user by touching the touch screen at the location of the stop sign 510 will disable the ride interruption event associated with stop sign 510.

The user interface 128 may include one or more menus to define configuration settings for the one or more ride interruption events, the one or more enhanced comfort events, or the one or more comfort adjustable vehicle components. The configuration settings may allow the user to define the one or more comfort adjustable vehicle components that are adjusted in response to a particular type of ride interruption event or enhanced comfort event. In some implementations, the configuration settings may allow the user to define the sensitivity of the adjustments to the one or more comfort adjustable vehicle components, e.g., the amount of power restricted to the engine, level of tint in the windows, the volume of the ambient noise, or the stiffness of the suspension system.

Figure 8:
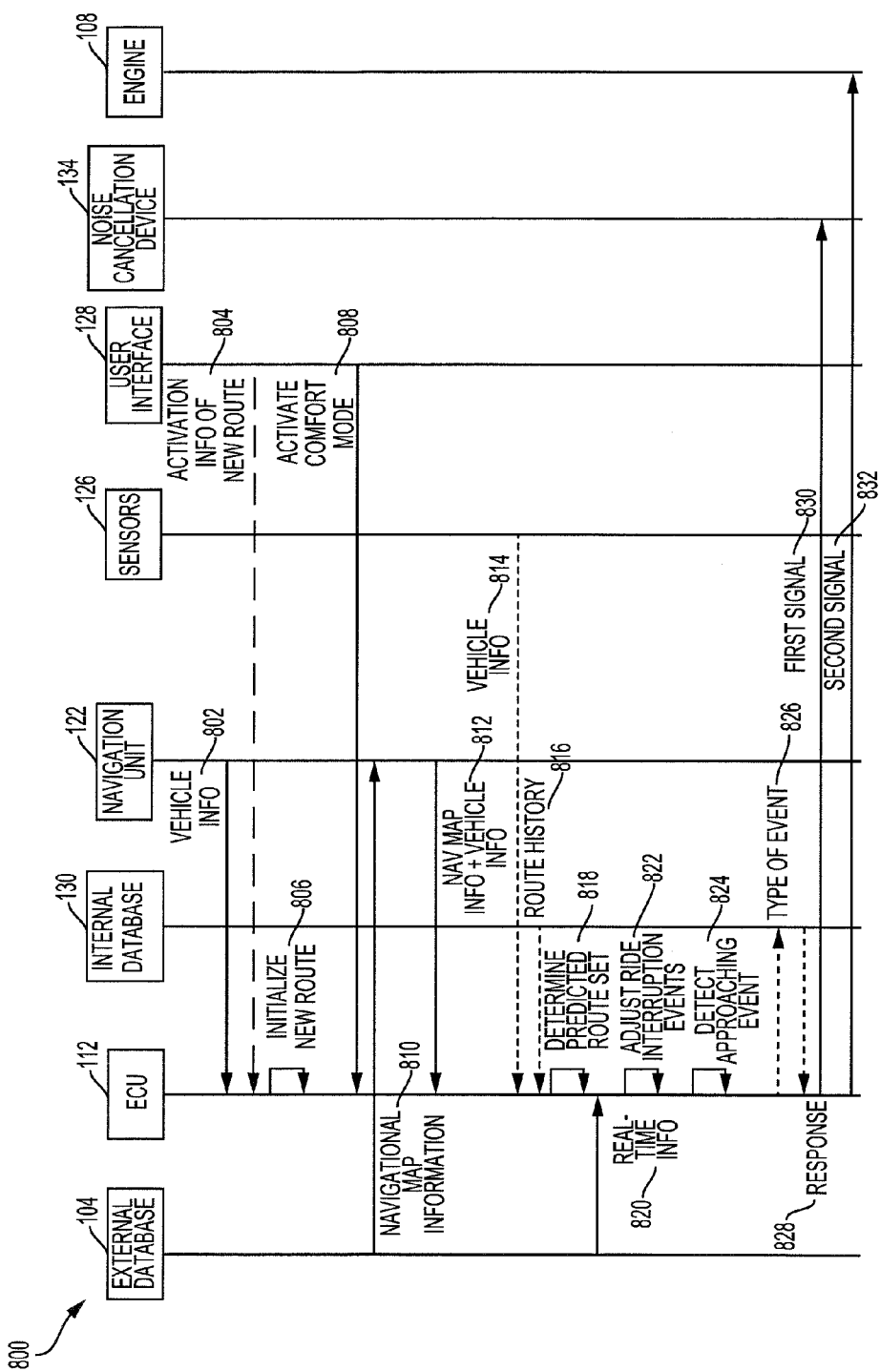
FIG. 8 shows an example sequence of component interactions to perform ride interruption event prediction according to an aspect of the invention.

FIG. 8 shows an example sequence of component interactions to perform ride interruption event prediction. One or more computers or one or more data processing apparatuses, for example, the ECU 112 or the navigation unit 122 of the enhanced comfort event prediction system 100 of FIG. 1, appropriately programmed, may perform the sequence 800.

The navigation unit 122 may send to the ECU 112 vehicle information that indicates to the ECU 112 that the vehicle is powered on (802) or the user interface 128 may send activation information to the ECU 112 (804). The activation information may include a new route inputted by a user or an indication from a user to turn-on the navigation unit 112. The ECU 112 may initialize the new route based on the received information (806).

The user interface 128 may receive a selection, from the user, of one or more user elements on the user interface 128 to activate or de-activate the enhanced comfort mode and send an indication to the ECU 112 (808). The user selection may be a selection of a button, a location on the touchscreen on the user interface, or any other user element that corresponds to the enhanced comfort mode.

One or more external databases 104 may send navigational map information to the navigation unit (810). The navigation unit 122 may send the navigational map information and the vehicle information to the ECU 112 (812). In some implementations, the sensors 126 may send vehicle information to the ECU 112 (814). The ECU 112 may request and receive from the internal database a route history (816). The ECU 112 may determine one or more predicted route sets using the navigational map information, the vehicle information, and/or the route history (818).

The one or more external databases 104 may send real-time information including traffic condition and road condition information that the ECU 112 may use to adjust and update ride interruption events (820). The ECU 112 may adjust the ride interruption events based on the received real-time information from the one or more external databases 104 (822). The ECU 112 may detect an approaching event based on the navigational map information and the vehicle information obtained from the one or more sensors 126 and/or navigation unit 122 (824).

In some implementations, the ECU 112 sends the type of event to the internal database 130 (826). In response, the internal database 130 sends to the ECU 112 the type of adjustments to be performed to one or more comfort adjustable vehicle components (828). The ECU 112 sends one or more signals to one or more comfortable adjustable vehicle components, e.g., a first signal to the noise cancellation device 134 to cancel internal background noise (830) and a second signal to the engine 108 to reduce engine power (832).

Although the vehicle discussed herein is operated by a driver, the systems and methods may be equally applicable to autonomous vehicles.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An enhanced comfort prediction system located within a vehicle, comprising:
  a navigation unit connected to one or more external databases through a network for obtaining navigational map information and vehicle information;
  one or more sensors that monitor an environment of the vehicle;
  a memory connected to the one or more sensors to store a route history having a plurality of previously-traveled routes;
  a plurality of comfort adjustable vehicle components connected to the memory and including a first comfort adjustable vehicle component and a second comfort adjustable vehicle component; and
  an electronic control unit that is coupled to at least the navigation unit, the one or more sensors, and the plurality of comfort adjustable vehicle components, the electronic control unit configured to:
    obtain, from the navigation unit, the navigational map information and the vehicle information;
    determine a plurality of potential predicted route sets and one or more predicted ride interruption events that are associated with the plurality of potential predicted route sets based on the vehicle information, the navigational map information, and the plurality of previously-traveled routes of the route history;
    select a predicted route set that has a least number of different locations amount of predicted ride interruption events among the plurality of potential predicted route sets; and
    operate the first comfort adjustable vehicle component in an enhanced comfort mode prior to the one or more predicted ride interruption events occurring.

2. The enhanced comfort prediction system of claim 1, further comprising:
  a user interface coupled to the electronic control unit and having one or more user interface elements;
  wherein the electronic control unit is further configured to:
    provide the predicted route set, a current location of the vehicle, and the one or more predicted ride interruption events to the user interface, wherein each of the one or more user interface elements corresponds to a respective ride interruption event;
    receive, from the user interface, a selection of one of the user interface elements; and
    cancel the respective ride interruption event that corresponds to the selected user interface element.

3. The enhanced comfort prediction system of claim 1, wherein the plurality of comfort adjustable vehicle components includes at least one of an entertainment center, a vehicle suspension device, a noise cancellation device, or an engine.

4. The enhanced comfort prediction system of claim 3, wherein the first comfort adjustable vehicle component is the noise cancellation device which cancels noise within the vehicle.

5. The enhanced comfort prediction system of claim 4, wherein the electronic control unit is further configured to:
  detect in the environment using the one or more sensors an enhanced comfort event; and
  operate the second comfort adjustable vehicle component in the enhanced comfort mode.

6. The enhanced comfort system of claim 1, wherein the electronic control unit is further configured to:
  obtain, from a user interface, a user selection to enter an internal quiet mode, an external quiet mode, or a total quiet mode; and
  measure, using the one or more sensors, an internal or external noise level based on the user selection;
  wherein the electronic control unit is configured operate the first comfort adjustable vehicle component based on the measurement and the user selection.

7. The enhanced comfort prediction system of claim 1, wherein the electronic control unit is further configured to:
adjust a sensitivity of the enhanced comfort mode of the first comfort adjustable vehicle component.

8. The enhanced comfort prediction system of claim 7, wherein the sensitivity is user configurable.

9. A computer-implemented method for an enhanced comfort mode for a vehicle, the method comprising:
determining, by an electronic control unit that is located within the vehicle, a plurality of potential predicted route sets and one or more predicted ride interruption events associated with the plurality of predicted route sets;
selecting, by the electronic control unit, a predicted route set of the plurality of predicted route sets that has a least number of different locations of predicted ride interruption events among the plurality of potential predicted route sets;
determining, by the electronic control unit, that the vehicle is moving along the predicted route set;
monitoring, by the electronic control unit using one or more sensors that are located within the vehicle, an environment of the vehicle for a first enhanced comfort event;
detecting, by the electronic control unit using the one or more sensors, the first enhanced comfort event based on the environment; and
in response to detecting the first enhanced comfort event or prior to the one or more ride interruption events occurring, sending, by the electronic control unit, one or more signals to at least one of a vehicle suspension device, a noise cancellation device, or an engine to adjust one or more settings of the at least one of the vehicle suspension device, the noise cancellation device, or the engine.

10. The computer-implemented method of claim 9, further comprising:
receiving, from a user interface, a selection of a user interface element that initializes the enhanced comfort mode; and
initializing the enhanced comfort mode for the vehicle.

11. The computer-implemented method of claim 9, wherein monitoring the environment of the vehicle for the first enhanced comfort event includes measuring noise levels inside and outside the vehicle, wherein detecting the first enhanced comfort event based on the environment includes determining that the measurements are greater than or equal to a threshold value.

12. The computer-implemented method of claim 9, further comprising:
displaying on a user interface that the first enhanced comfort event was detected;
receiving user input from the user interface to override the detected first enhanced comfort event; and
monitoring the environment for a second enhanced comfort event.

13. The computer-implemented method of claim 9, further comprising:
obtaining, from a navigation unit, navigational map information and vehicle information;
wherein determining the plurality of potential predicted route sets and the one or more predicted ride interruption events is based on the vehicle information and the navigational map information.

14. An enhanced comfort prediction system located within a vehicle, comprising:
a plurality of comfort adjustable vehicle components including a first comfort adjustable vehicle component and a second comfort adjustable vehicle component;
a memory connected to the plurality of comfort adjustable vehicle components; and
an electronic control unit that is coupled to the memory and the plurality of comfort adjustable vehicle components, the electronic control unit configured to:
determine, while the vehicle is in motion, a plurality of potential predicted route sets and one or more predicted ride interruption events that are associated with the plurality of potential predicted route sets;
select a predicted route set that has a least number of different locations of predicted ride interruption events among the plurality of potential predicted route sets; and
operate the first comfort adjustable vehicle component in an enhanced comfort mode that cancels noise within the vehicle prior to the one or more predicted ride interruption events occurring.

15. The enhanced comfort prediction system of claim 14, wherein the electronic control unit is configured to:
obtain information from the memory that indicates that the first comfort adjustable vehicle component is in the enhanced comfort mode; and
determine that the first comfort adjustable vehicle component is in the enhanced comfort mode based on the obtained information.

16. The enhanced comfort prediction system of claim 15, wherein the electronic control unit is configured to determine that a ride interruption event of the one or more predicted ride interruption events was realized.

17. The enhanced comfort prediction system of claim 16, wherein to determine that the ride interruption event was realized the electronic control unit is configured to:
calculate a distance between a current location of the vehicle and a location of the ride interruption event; and
determine that the calculated distance is greater than a threshold distance and that the calculated distance increases over time.

18. The enhanced comfort prediction system of claim 14, wherein the electronic control unit is further configured to:
operate the second comfort adjustable vehicle component in the enhanced comfort mode that reduces vibration prior to the one or more predicted ride interruption events occurring.

19. The enhanced comfort prediction system of claim 14, wherein the memory is configured to store the one or more predicted ride interruption events, wherein the electronic control unit is further configured to:
update, in the memory, the one or more predicted ride interruption events for the predicted route set based on a change in a condition along the predicted route set; and
adjust the predicted route set based on the change in the condition along the predicted route set.

* * * * *